United States Patent
Jiang et al.

(10) Patent No.: US 12,369,160 B2
(45) Date of Patent: Jul. 22, 2025

(54) SYSTEM AND METHOD FOR RECEIVING SHARED CHANNELS FOR MULTI TRP TRANSMISSION

(71) Applicant: ZTE CORPORATION, Guangdong (CN)

(72) Inventors: Chuangxin Jiang, Shenzhen (CN); Zhaohua Lu, Shenzhen (CN); Yu Ngok Li, Shenzhen (CN); Shujuan Zhang, Shenzhen (CN); Huahua Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 393 days.

(21) Appl. No.: 17/567,421

(22) Filed: Jan. 3, 2022

(65) Prior Publication Data
US 2022/0304039 A1    Sep. 22, 2022

Related U.S. Application Data

(63) Continuation of application No. PCT/CN2019/094720, filed on Jul. 4, 2019.

(51) Int. Cl.
*H04W 72/23* (2023.01)
*H04L 5/00* (2006.01)

(52) U.S. Cl.
CPC .......... *H04W 72/23* (2023.01); *H04L 5/0091* (2013.01)

(58) Field of Classification Search
CPC ............................ H04W 72/23; H04L 5/0091
See application file for complete search history.

(56) References Cited

U.S. PATENT DOCUMENTS

| | | | |
|---|---|---|---|
| 2019/0053318 A1 | 2/2019 | Nogami et al. | |
| 2019/0069285 A1 | 2/2019 | Chandrasekhar et al. | |
| 2019/0141693 A1* | 5/2019 | Guo | H04B 7/088 |
| 2021/0314927 A1* | 10/2021 | Noh | H04L 5/0053 |

FOREIGN PATENT DOCUMENTS

| | | |
|---|---|---|
| CN | 109952803 A | 6/2019 |
| RU | 2545527 C2 | 4/2015 |
| WO | WO-2018/143702 A1 | 8/2018 |

OTHER PUBLICATIONS

Huawei et al. "Rate matching for multi-TRP transmission for eMBB" 3GPP TSG RAN WGI #97 R1-1907529, May 17, 2019 (4 pages).
International Search Report and Written Opinion on PCT/CN2019/094720 dated Apr. 2, 2020 (9 pages).

(Continued)

*Primary Examiner* — Rhonda L Murphy
(74) *Attorney, Agent, or Firm* — Foley & Lardner LLP

(57) ABSTRACT

A system and method for providing receiving shared channels during multi TRP transmission are disclosed herein. In one embodiment, an example wireless communication method comprises: determining, by a wireless communication node, a plurality of sets of rate matching configurations. The method further comprises: associating, by the wireless communication node, the plurality of sets of rate matching configurations with respective group identifiers, and transmitting, by the wireless communication node to a wireless communication device, a signal indicating the plurality of sets of rate matching configurations and the group identifiers.

12 Claims, 5 Drawing Sheets

(56) References Cited

OTHER PUBLICATIONS

LG Electronics, "Enhancements on multi-TRP/panel transmission," 3GPP TSG RAN WGI Meeting #96bis R1-1904208, Apr. 12, 2019 (14 pages).

Ericsson, "On multi-TRP and multi-panel" 3GPP TSG RAN WG1 Meeting RAN1#97, R1-1907418, May 17, 2019, Reno, US (19 pages).

First Office Action for RU Appl. No. 2022102618, Dated Aug. 24, 2022 (with English translation, 15 pages).

CATT, "Open issues and corrections for NR PDCCH" 3GPP TSG RAN WG1 Meeting #94bis, R1-1810520, Oct. 12, 2018, Chengdu, China (6 pages).

Extended European Search Report for EP Appl. No. 19936216.1 dated Feb. 8, 2023 (10 pages).

First Office Action for CN Appl. No. 202210827624.5, dated Nov. 29, 2022 (with English translation, 13 pages).

Fraunhofer IIS, Fraunhofer HHI, "Enhancements on multi-TRP/panel transmission," 3GPP TSG RAN WG1 Meeting #97, R1-1907054, May 13-17, 2019, Reno, USA (5 pages).

Nokia et al., "NR_newRAT-Core—Release 15" 3GPP TSG-RAN WG2 #101, R2-1802612, Mar. 2, 2018, Athens, Greece (9 pages).

Samsung, "New MAC CEs for NR MIMO" 3GPP TSG-RAN WG2 Meeting #101, R2-1802418, Mar. 2, 2018, Athens, Greece (18 pages).

ZTE, "On multi-PDCCH design for multi-TRP," 3GPP TSG RAN WG1 #97, R1-1906242, May 13-17, 2019, Reno, USA (4 pages).

ZTE, Sanechips, "Consideration on Enhancement of TCI-State MAC CE for Multi-TRP transmission," 3GPP TSG-RAN WG2 Meeting #106, R2-1906125, May 13-17, 2019, Reno, USA (7 pages).

\* cited by examiner

SYSTEM AND METHOD FOR RECEIVING SHARED CHANNELS FOR MULTI TRP TRANSMISSION

CROSS-REFERENCE TO RELATED APPLICATION

This application claims the benefit of priority under 35 U.S.C. § 120 as a continuation of PCT Patent Application No. PCT/CN2019/094720, filed on Jul. 4, 2019, the disclosure of which is incorporated herein by reference in its entirety.

TECHNICAL FIELD

The disclosure relates generally to wireless communications and, more particularly, to systems and methods for receiving shared channels for transmissions using multi transmission and receiving points (TRP).

BACKGROUND

In NR release 15 of the 5G specification, multiple TRP transmission was not considered. In other words, current Rel-15 specification does not support data transmission from multiple TRPs to one UE, where two TRPs (e.g., TRP 0 and TRP 1) transmit PDSCH to the same UE. Furthermore, the cost of providing an ideal backhaul to achieve nearly perfect synchronization between multiple TRPs is usually high, which leads operators to deploy a non-ideal backhaul between TRPs. In case of the deployment of a non-ideal backhaul, multiple TRPs which transmit data to the same UE cannot communicate with each other dynamically, because of the lack of synchronization between them. This may lead to severe interference between the transmissions from multiple TRPs, unless systems and methods are developed to coordinate the transmissions from multiple TRPs with each other, at least on a semi-static basis.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, an example wireless communication method comprises: determining, by a wireless communication node, a plurality of sets of rate matching configurations. The method further comprises: associating, by the wireless communication node, the plurality of sets of rate matching configurations with respective group identifiers, and transmitting, by the wireless communication node to a wireless communication device, a signal indicating the plurality of sets of rate matching configurations and the group identifiers.

In another embodiment, a wireless communication method comprises: dividing, by a wireless communication node, a plurality of state fields of a medium access control (MAC) control element (CE) into a plurality of field sets. The method further comprises: associating, by the wireless communication node, the plurality of field sets with respective group identifiers, and transmitting, by the wireless communication node to a wireless communication device, a signal indicating the plurality of field sets and associated group identifiers.

In yet another embodiment, a wireless communication method comprises: receiving, by a wireless communication device from a wireless communication node, a signal indicating a plurality of sets of rate matching configurations and associated group identifiers. The method further comprises: identifying, by the wireless communication device based on a received control channel, a first one of the group identifiers and one of the plurality of sets of rate matching configurations corresponding to the first group identifier, and determining, by the wireless communication device, resources to be excluded from receiving a shared channel, according to the identified set of rate matching configurations.

In another embodiment, a wireless communication method comprises: receiving, by a wireless communication device, a signal indicating a plurality of field sets and respective group identifiers, from a wireless node. The method further comprises: retrieving, by the wireless communication device, an association of the plurality of field sets with the respective group identifiers, and determining, by the wireless communication device, resources to be used for receiving a shared channel or triggering a CSI, according to one of the plurality of field sets corresponding to one of the respective group identifiers.

The above and other aspects and their implementations are described in greater detail in the drawings, the descriptions, and the claims.

BRIEF DESCRIPTION OF THE DRAWINGS

Various example embodiments of the present disclosure are described in detail below with reference to the following figures or drawings. The drawings are provided for purposes of illustration only and merely depict example embodiments of the present disclosure to facilitate the reader's understanding of the present disclosure. Therefore, the drawings should not be considered limiting of the breadth, scope, or applicability of the present disclosure. It should be noted that for clarity and ease of illustration, these drawings are not necessarily drawn to scale.

DETAILED DESCRIPTION OF EXAMPLE EMBODIMENTS

Various example embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

It is advantageous to provide data transmission from multiple TRPs to one UE, where two TRPs (e.g., TRP 0 and TRP 1) transmit PDSCH to the same UE for 5G NR communication systems, to provide receive diversity at the UE, and to be able to support higher rates of data transmission to the UE. In one embodiment, the present disclosure provides systems and methods for supporting signaling improvement for multi TRP transmission by mitigating the potential interference between the transmissions from multiple TRPs, even in the absence of support for such multi TRP transmission in the Rel-15 5G specification. In another embodiment, the present disclosure provides systems and methods for supporting separate indications of dynamic information for two coordinated TRPs, especially separate Quasi co-location (QCL) information. The workings of these embodiments, and their variants, are described in details in the remainder of the present disclosure.

Figure 1:
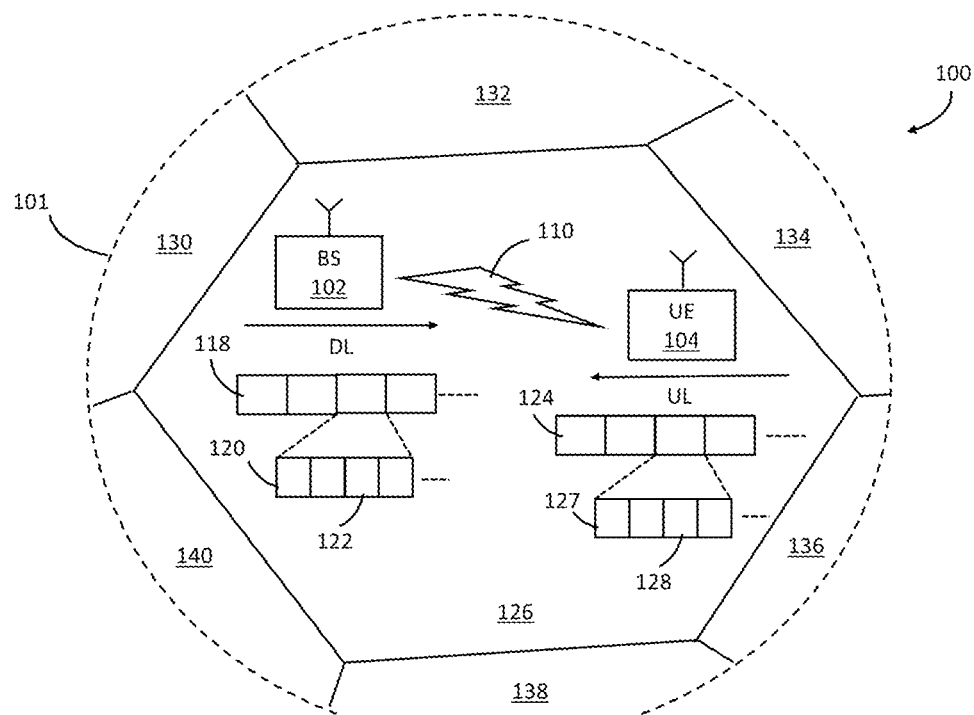
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a next generation node B (gNB), a TRP, or simply, a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present disclosure. It should be understood that the terms gNB and TRP may be used interchangeably throughout the following disclosure.

Figure 2:
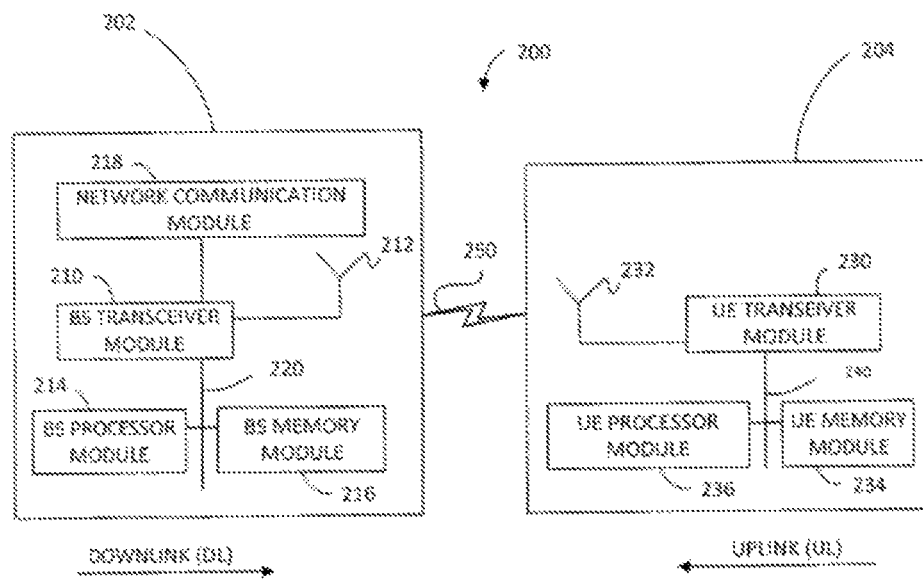
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a next generation node B (gNB), a TRP, an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3A:
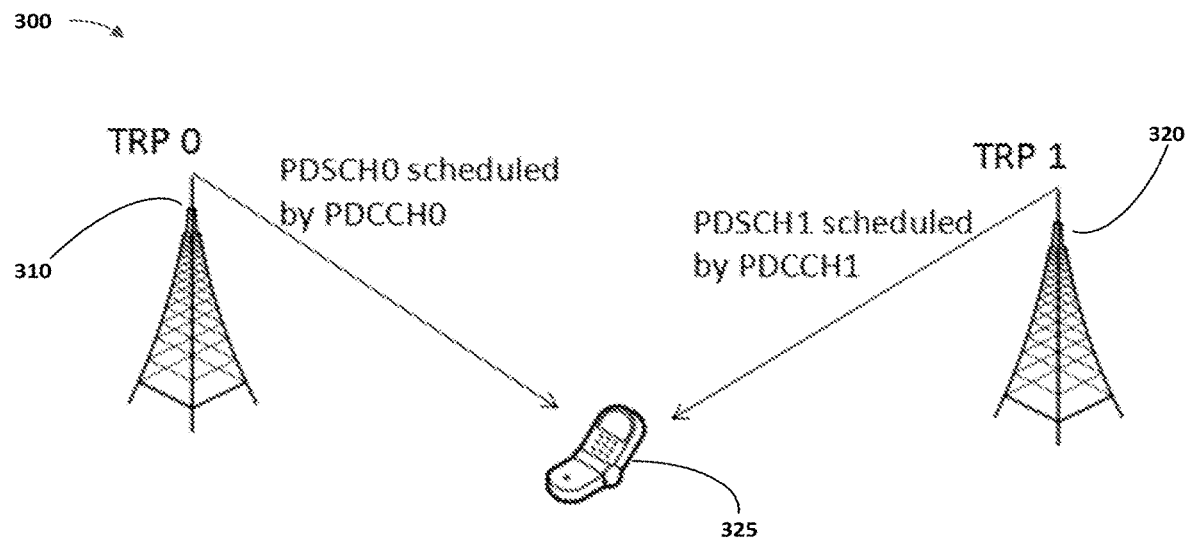
FIG. 3A illustrates an example wireless network depicting the independent scheduling of multiple TRPs to a UE.

Referring to FIG. 3A, a wireless network 300 is depicted with independent scheduling of shared physical layer channels by multiple TRPs (by TRP 0, shown as 310, and by TRP 1, shown as 320) to a UE 325. There is no dynamic coordination (or near perfect synchronization) among TRP 0 (310) and TRP 1 (320) because of the non-ideal backhaul (not shown in FIG. 3A) between the TRPs. But the systems and methods of the present disclosure enable coordination between the TRPs (even in the absence of synchronization between the TRPs), so that it is possible to support independent physical layer scheduling among TRPs. As shown in FIG. 3A, TRP 0 (310) and TRP1 (320) schedule PDSCH 0 and PDSCH 1 by PDCCH 0 and PDCCH 1 respectively.

Since TRP 0 (310) and TRP1 (320) have different locations, the Quasi co-location (QCL) information sent to the UE 325 from the coordinated TRP 0 (310) and TRP1 (320) should be different for both PDCCH and PDSCH transmissions. In addition, other physical layer channels, e.g., ACK/NACK feedback, HARQ processing, PDSCH scrambling, etc., should also be separate for the coordinated TRPs, TRP 0 (310) and TRP1 (320).

For clarity of the specification, one higher layer index configured per Control resource set (CORESET) is used to identify a TRP. For instance, PDCCH (or DCI) and scheduled PDSCH from CORESET with higher layer index 0 can be regarded as that from TRP 0, PDCCH (or DCI) and scheduled PDSCH from CORESET with higher layer index 1 can be regarded as that from TRP 1. In short, a higher layer index configured per CORESET refers to a TRP. Different higher indices refer to different TRPs. For simplicity, we denote the higher layer index configured per CORESET as CORESET group ID.

Many 5G base stations in the initial stages of deployment are likely to be non-standalone (NSA) and need to relay on LTE base stations to transmit control signaling to NR UEs. These 5G base stations have to be coexistent with LTE base station in the same coverage area. However, some signals from LTE base station will cause severe interference to NR UEs, e.g. LTE CRS (Cell-specific reference signals). Therefore, in the coexistence between LTE and NR, NR UE should do rate matching around LTE CRS REs (Resource Element) in a serving cell. In other words, LTE CRS REs are not available for PDSCH reception of all NR UEs in the same serving cell. Consequently, NR base station can configure one LTE CRS configuration (lte-CRS-ToMatchAround) to all UEs of a serving cell. In other words, lte-CRS-ToMatchAround is a serving cell specific parameter. It is conventionally informed to UEs of a serving cell or carrier by broadcast channel. So all UEs in the serving cell can do the rate matching for PDSCH reception. Conventionally, it is configured under parameter ServingCellConfig or ServingCellConfigCommon which are cell specific parameters of a UE's serving cell. The cell specific CRS configuration is very efficient since each TRP or gNB (i.e., NR base station) does not need to configure this parameter many times for each UE in the serving cell. However, it may cause some problem if multiple TRP transmission is considered.

Figure 3B:
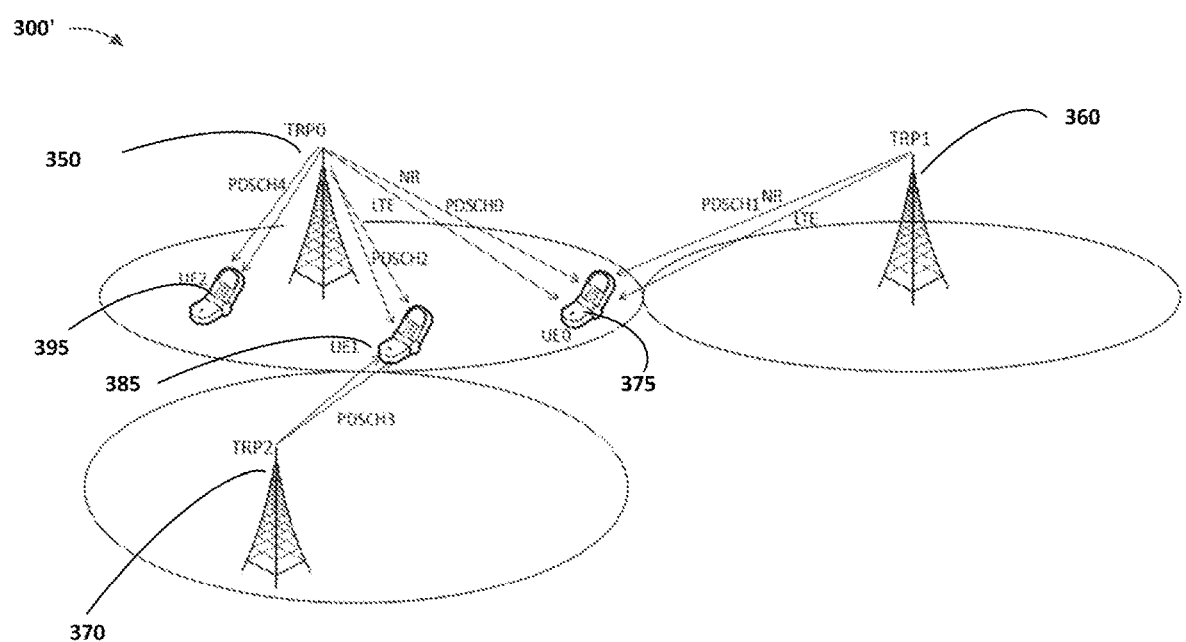
FIG. 3B illustrates an example embodiment of a wireless network in which NR and LTE base stations provide coverage to the same geographical area, while supporting multi TRP transmission to UEs.

Referring now to FIG. 3B, a wireless network 300' is depicted in which NR and LTE base stations may cover the same geographical area. For example, base station 350 (which is an example of a NSA mode alluded to earlier, wherein the 5G base station relays control signals using LTE base stations) is shown in FIG. 3B as transmitting both a NR and a LTE control channel, with the NR control channel meant to serve NR-capable UE0 (shown as 375) while only-LTE-capable UE1 (shown as 385) receiving a LTE control channel. Also shown in FIG. 3B are: base station 350 transmitting a NR control channel to UE2 395, base station 360 transmitting a NR control channel to UE0 375, and base station 370 transmitting a LTE control channel to UE1 (385). NR and LTE may transmit signal in the same area, and two NR base stations transmit data to the same UE. Specifically, UE0 375 and UE1 385 are in a serving cell of TRP 0 (350). TRP 0 (350) and TRP 1 (360) do the multiple TRP transmission to the UE0 375, and TRP 0 (350) and TRP 2 (370) do the multiple TRP transmission to the UE0 375. It should be understood that the wireless networks and components of FIG. 3A and FIG. 3B are example embodiments of the general wireless network diagrams introduced in FIG. 1 and FIG. 2, and provide more details in furtherance of explaining the working of a wireless network for 5G communication systems.

Referring back to FIG. 3B, because the cell of TRP 0 (350) is the serving cell of all UE0 375, UE1 385 and UE2 395, TRP 0 (350) can configure these UEs with the LTE CRS configuration, then all of UEs in the serving cell of TRP0 (350) should do rate matching around LTE CRS REs which are transmitted from TRP 0 (350). However, for UE0 375, PDSCH1 should do rate matching around CRS REs which are transmitted from TRP 1 (360). So UE0 375 may be configured with two CRS configurations, i.e. two CORESET group IDs may be configured to UE0 375 for multi TRP transmission. Likewise, UE1 385 may be configured with two CRS configurations as well. But the second CRS configurations for UE0 375 and UE1 385 may be different since they are from different TRPs. Therefore, simply extending the cell specific CRS configuration to multiple TRPs is not feasible.

Figure 4:
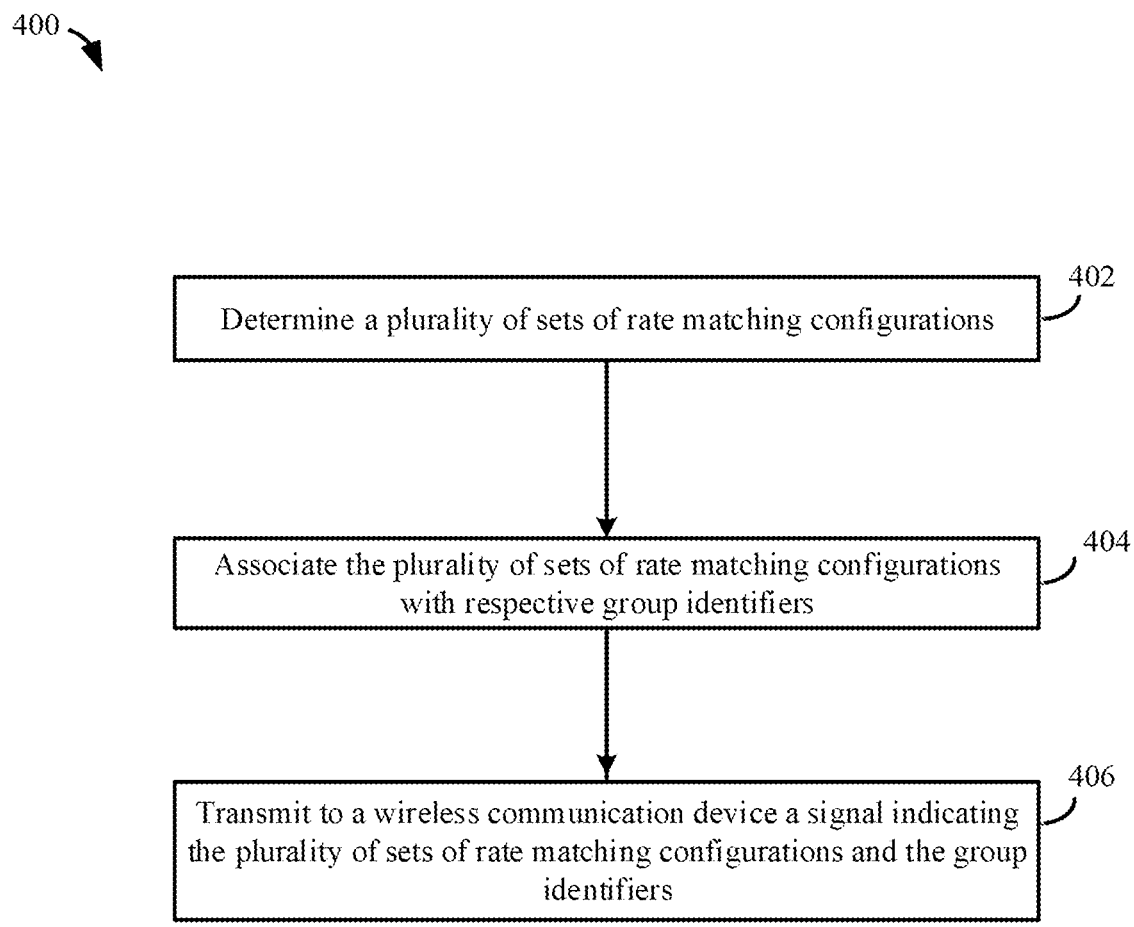
FIG. 4 depicts a method from the point of view of a wireless node, for the transmission of a signal to a wireless communication device, indicating a plurality of sets of rate matching configurations and respective group identifiers.

Referring now to FIG. 4, a method 400 is depicted from the point of view of a wireless node, for the transmission of a signal to a wireless communication device, indicating the plurality of sets of rate matching configurations and respective group identifiers.

At step 402, the wireless node determines a plurality of sets of rate matching configurations. In one embodiment, the wireless node may be a gNB or a TRP. The rate matching configurations may belong to N>1 number of TRPs or gNBs, i.e., the TRP may determine a plurality of sets of rate matching configurations which may belong to multiple TRPs.

At step 404, the wireless node performs an association of the plurality of sets of rate matching configurations with the respective group identifiers of the wireless nodes which contribute to the sets of configurations. As alluded to before, there may be N>1 number of wireless nodes, each providing a set of rate matching configurations.

At step 406, the wireless node transmits to a wireless communication device a signal indicating the plurality of sets of rate matching configurations and the respective group identifiers. In one embodiment, the wireless communication device may be a UE.

Figure 5:
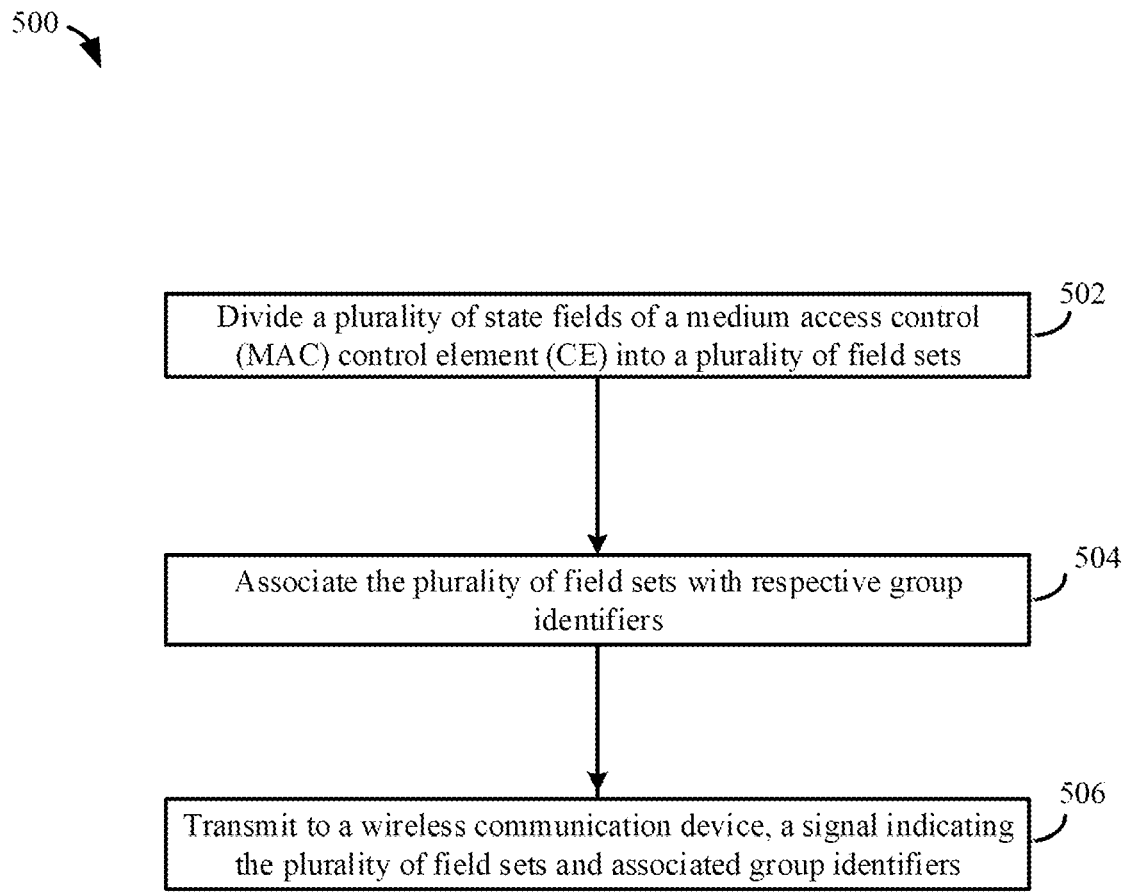
FIG. 5 illustrates a method from the point of view of a wireless node, for the transmission of a signal to a wireless communication device, indicating a plurality of medium access control (MAC) control element (CE) field sets and associated group identifiers.

Referring now to FIG. 5, a method 500 is depicted from the point of view of a wireless node, for the transmission of a signal to a wireless communication device, indicating the mapping between a plurality of medium access control (MAC) control element (CE) field sets and associated group identifiers.

At step 502, the wireless node divides the plurality of state fields of a MAC CE into a plurality of field sets.

At step 504, the wireless node performs an association of the plurality of field sets with respective group identifiers.

At step 506, the wireless node transmits to a wireless communication device a signal indicating the plurality of field sets and the associated group identifiers. In one embodiment, the wireless communication device may be a UE.

Figure 6:
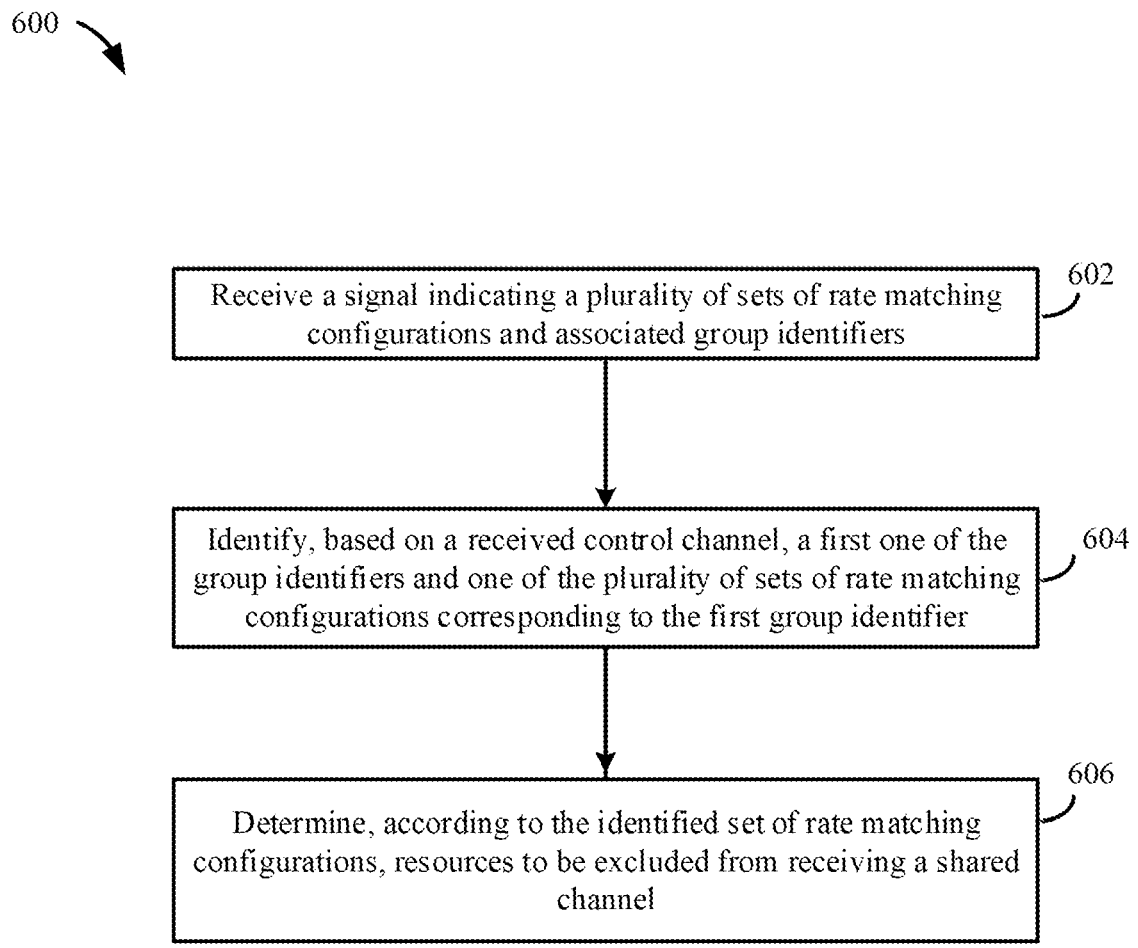
FIG. 6 depicts a method from the point of view of a wireless communication device, which receives a signal from a wireless node about resources to be used for scheduling a shared channel.

Referring now to FIG. 6, a method 600 is depicted from the point of view of a wireless communication device, which receives a signal from a wireless node about scheduling a shared channel.

At step 602, the wireless communication device receives from a wireless communication node, a signal indicating a plurality of sets of rate matching configurations and associated group identifiers. In one embodiment, the wireless communication device may be a UE and the signal may contain a set of rate matching configuration for N>1 number of wireless nodes. In one embodiment, the wireless node be a gNB.

At step 604, the wireless communication device identifies, based on a received control channel, a first one of the group identifiers and one of the plurality of sets of rate matching configurations corresponding to the first group identifier.

At step 606, the wireless communication device determines, according to the identified set of rate matching configurations, resources to be excluded from receiving a shared channel.

In the remainder of the disclosure, various embodiments are described with respect to the details of signaling, field names, field values, etc., as described in the 5G specification, which should be familiar to a person with ordinary skill in the art as applicable to 5G wireless communications. It should be understood that the numerous embodiments described below build upon the example wireless network 300' depicted in FIG. 3B above. In what follows, numerous embodiments are described, which explain how different components of 5G wireless communication systems (a TRP or a gNB, or a UE) mitigate the challenges of a non-ideal backhaul to overcome potential interference issues between the transmissions of multiple TRPs to a single UE by specific reference to parameters, messages, and/or fields as defined in a current or future release of the relevant 5G specification. It should be understood that even though many of the embodiments describe methods to overcome the interference problems during multi TRP transmission from the point of view of a wireless node or base station (e.g., a TRP or a gNB), but that the embodiments are applicable to a UE too, since it is the UE which receives the control channels and/or the shared channels transmitted by the wireless node, and performs actions corresponding to the modified signaling or field values described in the various embodiments.

Embodiment #1

In one embodiment, during multi TRP transmissions, a UE is configured with N>1 sets of LTE CRS configurations. At least one set of the LTE CRS configurations is cell specific. The other(s) is UE specific, i.e. different UEs can be configured with different values of CRS configuration parameters. Each set can include more than 1 CRS configurations. That's because one NR carrier, which corresponds to one serving cell, may be much wider than an LTE carrier, even for single TRP transmission. E.g. UE2 395 in FIG. 3B, which receives a NR control channel, may be configured with multiple LTE CRS configurations. Furthermore, the cell specific set of LTE CRS configurations is usually configured under ServingCellConfigCommon and/or ServingCellConfig. The UE specific set(s) is configured under PDSCH-ServingCellConfig or PDSCH-Config or still under ServingCellConfig.

Embodiment #1-1

In one embodiment, the REs of LTE CRS configuration set n are not available for PDSCH(s) associated with CORESET group ID n, where n=0, . . . , N-1. It should be understood that the term "not available" is used throughout the present disclosure to mean that the UE excludes the REs corresponding to the LTE configuration(s) while receiving a shared channel (e.g., PDSCH) scheduled by the control channel associated with CORESET group ID n, where n=0, . . . , N-1. Furthermore, the first set of LTE CRS configurations is configured under ServingCellConfig and/or ServingCellConfigCommon. The other set(s) is configured under PDSCH-ServingCellConfig or PDSCH-Config or still under ServingCellConfig.

Referring back to in FIG. 3B, taking N=2 as an example for UE0 375, the first set of LTE CRS configuration is cell specific, it is configured under ServingCellConfig and/or ServingCellConfigCommon. If PDSCH is scheduled by a DCI from a CORESET with the higher layer index 0 (CORESET group ID 0) or without configuring the higher index, the REs of LTE CRS(s) from the first set of LTE CRS configurations are not available for this PDSCH resource mapping. The second set of LTE CRS configurations is UE specific, it is configured under PDSCH-ServingCellConfig or PDSCH-Config or still under ServingCellConfig. If PDSCH is scheduled by a DCI from a CORESET with the higher layer index 1(CORESET group ID 1), the REs of LTE CRS(s) from the second set of LTE CRS configurations are not available for this PDSCH resource mapping. Based on this embodiment, LTE CRS patterns configured under ServingCellConfig and/or ServingCellConfigCommon are still cell specific parameters, i.e., PDSCH 0, 2, 4 in FIG. 3B should do rate matching around REs of these CRS patterns. For single TRP transmission as the same as Rel-15 UEs, e.g. UE2 385 in FIG. 3B, there is no need to configure the UE2 385 with UE specific CRS configuration. Since UE2 385 is not configured with multiple TRP transmission, CORESET group ID will not be configured per each CORESET. For multiple TRP transmission UE0 375 and UE1 385, CORESET group ID 0 is predefined as TRP 0 (350). CORESET group ID 1 for UE0 375 is regarded as TRP 1 (360), and CORESET group ID 1 for UE1 385 is regarded as TRP 2 (370). Therefore, the rate matching patterns of the second PDSCH (PDSCH 1) for UE0 375 and second PDSCH (PDSCH3) for UE1 385 can be different since the corresponding CRS patterns are UE specific.

Cell specific rate matching parameters also include rate matching patterns, which are used for PDSCH resource mapping with RB symbol level granularity. Thus, the embodiments of the present disclosure may also be used for rate matching patterns. In other words, cell specific rate matching patterns are predefined that are not available for PDSCH scheduled by a DCI with CORESET group ID 0. For UE specific rate matching patterns, some new UE specific rate matching patterns (not defined in Rel-15) can be introduced for PDSCH scheduled by a DCI with CORESET group ID 1. The new UE specific rate matching patterns can be configured under PDSCH-ServingCellConfig or PDSCH-Config.

Considering UE complexity, in one embodiment, a maximum two TRPs may be allowed to transmit data to a UE. So one set of LTE CRS configuration corresponds to one LTE serving cell. Therefore, within one set, multiple LTE CRS configurations refers to different LTE carriers in frequency domain. So CRS of multiple LTE CRS configurations within the same set (i.e. associated with the same CORESET group ID) should not map on the same PRB or should be non-overlapping in the frequency domain.

Embodiment #1-2

If the interference among coordinated TRPs is not severe for multiple TRP transmission or the UE has advanced receiver to cancel this kind of interference, it is possible in one embodiment to save overhead for each PDSCH. However, the interference among coordinated TRPs cannot be neglected especially for UEs without advanced receivers since the channel quality from a UE to all coordinated TRPs is good enough if the UE is configured with multi-TRP transmission.

In one embodiment, CRS from TRP 1 (360) can cause severe interference to PDSCH 0 reception, as shown in FIG. 3B. So a solution may be that PDSCH scheduled by a DCI, no matter from which CORESET groups, should do rate matching around CRS REs from both cell specific and UE specific CRS configurations. In other words, REs of both cell specific and UE specific CRS configurations are not available for PDSCH which is scheduled by a DCI from any of CORESET groups (or by a DCI associated with any of CORESET group IDs). Taking N=2 as an example for UE0 375, the first set of LTE CRS configuration is cell specific, it is configured under ServingCellConfig and/or ServingCellConfigCommon. No matter a PDSCH is scheduled by a DCI from a CORESET with the higher layer index 0 or 1 (CORESET group ID 0 or 1) or without configuring the higher index, the REs of LTE CRS(s) from the first set of LTE CRS configurations are not available for this PDSCH resource mapping. The second set of LTE CRS configurations is UE specific, it is configured under PDSCH-ServingCellConfig or PDSCH-Config. No matter a PDSCH is scheduled by a DCI from a CORESET with the higher layer index 0 or 1 (CORESET group ID 0 or 1) or without configuring the higher index, the REs of LTE CRS(s) from the second set of LTE CRS configurations are not available for this PDSCH resource mapping.

Embodiment #1-3

Compared with Embodiment 1-1 and 1-2, another embodiment may offer more flexibility in which the REs of LTE CRS configuration set n at least are not available for PDSCH(s) associated with CORESET group ID n, where n=0, . . . , N-1. Acquiescently, the REs of LTE CRS configuration set n are not available for PDSCH(s) associated with CORESET group ID n. And gNB needs to additionally inform UE whether REs of LTE CRS configuration set n are available or not available for PDSCH(s) associated with CORESET group ID n', where n is not equal to n'. This additional signaling is UE specific RRC signaling which can be denoted as resource control message.

Embodiment #1-4

Yet another embodiment may be to predefine that the REs of LTE CRS configuration set n at least are not available for PDSCH(s) associated with CORESET group ID n, and also predefine that the REs of the first LTE CRS configuration set (cell specific set) are not available for PDSCH(s) associated with any of CORESET group IDs. In addition, gNB needs to additionally inform UE whether REs of LTE CRS configuration set(s) other than the first set are available or not available for PDSCH(s) associated with CORESET group ID 0. This additional signaling is UE specific RRC signaling.

Embodiment #1-5

Another embodiment is to configure one or more index per each LTE CRS configuration of the second LTE CRS configuration set. Option 1 is to configure one higher layer index (denoted as CRS group ID) per each LTE CRS configuration of the second LTE CRS configuration set. The value of CRS group ID can be from 0 to X-1. X is at least 3. Therefore, all LTE CRS configurations in the second LTE CRS configuration set are divided into X groups. For instance, X=3, so all configured RateMatchPatternLTE-CRS in the second set are divided into three CRS groups. In the second set, CRS configurations with CRS group ID 0 belong to CRS group 0, CRS configurations with CRS group ID 1 belong to CRS group 1, CRS configurations with CRS group ID 2 belong to CRS group 2. Then REs of CRS in CRS group 0 is not available for PDSCH associated with CORESET group 0. In other words, REs of LTE CRS configuration(s) with CRS group ID 0 in the second set are not available for PDSCH scheduled by a DCI from a CORESET with higher layer index 0. REs of CRS in CRS group 1 are not available for PDSCH associated with CORESET group 1. In other words, REs of LTE CRS configuration(s) with CRS group ID 1 in the second set are not available for PDSCH scheduled by a DCI from a CORESET with higher layer index 1. REs of CRS in CRS group 2 is not available for PDSCHs both from CORESET group 0 and CORESET group 1. In other words, REs of LTE CRS configuration(s) with CRS group ID 2 in the second set are not available for PDSCH scheduled by a DCI from a CORESET with any of higher layer index 0 or 1.

An example to introduce one CRS group ID is as follows.

```
RateMatchPatternLTE-CRS ::=     SEQUENCE {
    CRS-group-id                INTEGER (0...2), OPTIONAL,
    carrierFreqDL               INTEGER (0..16383),
    carrierBandwidthDL          ENUMERATED {n6, n15, n25, n50, n75, n100, spare2, spare1},
    mbsfn-SubframeConfigList    EUTRA-MBSFN-SubframeConfigList, OPTIONAL,
    nrofCRS-Ports               ENUMERATED {n1, n2, n4},
    v-Shift                     ENUMERATED {n0, n1, n2, n3, n4, n5}
}
```

Option 2 is to introduce multiple higher layer indices (denoted as CRS group ID) per each CRS configuration in the second set. Each CRS group ID corresponds to each CORESET group ID. If the value of CRS group ID x is 1 in a CRS configuration, REs of this CRS configuration will not be available for PDSCH scheduled by a DCI from CORESET group x. If the value of CRS group ID x is 0 in a CRS configuration, REs of this CRS configuration will be available for PDSCH scheduled by a DCI from CORESET group x. Alternatively, if the value of CRS group ID x is 0 in a CRS configuration, REs of this CRS configuration will not be available for PDSCH scheduled by a DCI from CORESET group x. If the value of CRS group ID x is 1 in a CRS configuration, REs of this CRS configuration will be available for PDSCH scheduled by a DCI from CORESET group x.

An example to introduce two CRS group ID is as follows.

```
RateMatchPatternLTE-CRS ::=      SEQUENCE {
  CRS-group-id0               ENUMERATED {0,1}   OPTIONAL,
  CRS-group-id1               ENUMERATED {0,1}   OPTIONAL,
  carrierFreqDL               INTEGER (0.. 16383),
  carrierBandwidthDL          ENUMERATED {n6, n15, n25, n50, n75, n100,
spare2, spare1},
  mbsfn-SubframeConfigList        EUTRA-MBSFN-SubframeConfigList
OPTIONAL,
  nrofCRS-Ports               ENUMERATED {n1, n2, n4},
  v-Shift                     ENUMERATED {n0, n1, n2, n3, n4, n5}
}
```

Based on above embodiments, each UE specific CRS configuration can be configured as not available REs for PDSCH scheduled by a DCI from CORESET group ID 0, or 1 or both, thus, achieving flexibility in those embodiments. For the LTE CRS configuration in the first set, the REs of these CRS can be predefined as not available for PDSCH scheduled by a DCI from CORESET group ID 0. Alternatively, for the LTE CRS configuration in the first set, the REs of these CRS can be predefined as not available for PDSCH scheduled by a DCI from all CORESET groups, i.e. any of CORESET group ID 0 or 1 if only two CORESET groups are supported.

It should be noted that the name of CRS configuration ID may be different in future releases of the NR specification, i.e., the name may not be RateMatchPatternLTE-CRS, but the functionality will be for PDSCH resource mapping around LTE CRS.

For rate matching patterns, the examples can be follows

```
RateMatchPattern ::=    SEQUENCE {
  rateMatchPatternId       RateMatchPatternId,
  CRS-group-id             INTEGER (0...2), OPTIONAL
  ...
}
RateMatchPattern ::=    SEQUENCE {
  rateMatchPatternId       RateMatchPatternId,
  CRS-group-id0            ENUMERATED {0,1}   OPTIONAL,
  CRS-group-id1            ENUMERATED {0,1}   OPTIONAL,
  ...
}
```

The embodiments described above introduce new higher layer index into each CRS configuration, and provide most flexibility. However, the structure of IE RateMatchPatternLTE-CRS will be changed. This may cause some backward compatible issue since the IE RateMatchPatternLTE-CRS may not have reserved bits. So, in some other embodiments, new RRC signaling is introduced outside of IE RateMatchPatternLTE-CRS to inform the UE whether each LTE CRS pattern in the second set is not available for PDSCH scheduled by a DCI from CORESET group ID 0 only, or group ID 1 only, or any of group IDs. Specifically, new RRC signaling is used to indicate three options: A LTE CRS pattern in the second set is not available for PDSCH scheduled by a DCI from CORESET group ID 0 only, a LTE CRS pattern in the second set is not available for PDSCH scheduled by a DCI from CORESET group ID 1 only, a LTE CRS pattern in the second set is not available for PDSCH scheduled by a DCI from CORESET group ID 0 and 1. The new RRC signaling can be still similar with CRS group ID, but it will be configured per CRS configuration, and outside CRS configuration.

Embodiment #2

Since cell specific parameters can be modified by UE specific parameters in future releases of the NR specification, the various embodiments of the present disclosure may support multiple LTE CRS configurations (i.e., there may not be a need to introduce multiple sets of LTE CRS configurations), and configure one or more index per each LTE CRS configuration. Option 1 is to configure one higher layer index (denoted as CRS group ID) per each LTE CRS configuration. The value of CRS group ID can be from 0 to X-1. X is at least 3. Therefore, all LTE CRS configurations are divided into X groups. For instance, X=3, so all configured RateMatchPatternLTE-CRS are divided into three CRS groups. CRS configurations with CRS group ID 0 belong to CRS group 0, CRS configurations with CRS group ID 1 belong to CRS group 1, CRS configurations with CRS group ID 2 belong to CRS group 2. Then REs of CRS in CRS group 0 is not available for PDSCH associated with CORESET group 0. In other words, REs of LTE CRS configuration(s) with CRS group ID 0 are not available for PDSCH scheduled by a DCI from a CORESET with higher layer index 0. REs of CRS in CRS group 1 is not available for PDSCH associated with CORESET group 1. In other words, REs of LTE CRS configuration(s) with CRS group ID 1 are not available for PDSCH scheduled by a DCI from a CORESET with higher layer index 1. REs of CRS in CRS group 2 is not available for PDSCHs both from CORESET group 0 and CORESET group 1. In other words, REs of LTE CRS configuration(s) with CRS group ID 2 are not available for PDSCH scheduled by a DCI from a CORESET either with higher layer index 0 or 1.

An example to introduce one CRS group ID is as follows.

```
RateMatchPatternLTE-CRS ::=    SEQUENCE {
  CRS-group-id          INTEGER (0...2), OPTIONAL,
    carrierFreqDL       INTEGER (0.. 16383),
    carrierBandwidthDL      ENUMERATED {n6, n15, n25, n50, n75, n100, spare2, spare1},
    mbsfn-SubframeConfigList    EUTRA-MBSFN-SubframeConfigList OPTIONAL,  -- NeedM
    nrofCRS-Ports       ENUMERATED {n1, n2, n4},
    v-Shift             ENUMERATED {n0, n1, n2, n3, n4, n5}
}
```

Option 2 is to introduce multiple higher layer indices (denoted as CRS group ID) per each CRS configuration. Each CRS group ID corresponds to each CORESET group ID. If the value of CRS group ID x is 1 in a CRS configuration, REs of this CRS configuration will not be available for PDSCH scheduled by a DCI from CORESET group x. If the value of CRS group ID x is 0 in a CRS configuration, REs of this CRS configuration will be available for PDSCH scheduled by a DCI from CORESET group x. Alternatively, if the value of CRS group ID x is 0 in a CRS configuration, REs of this CRS configuration will not be available for PDSCH scheduled by a DCI from CORESET group x. If the value of CRS group ID x is 1 in a CRS configuration, REs of this CRS configuration will be available for PDSCH scheduled by a DCI from CORESET group x.

An example to introduce two CRS group ID is as follows.

```
RateMatchPatternLTE-CRS ::=    SEQUENCE {
CRS-group-id0            ENUMERATED {0,1}   OPTIONAL,
CRS-group-id1            ENUMERATED {0,1}   OPTIONAL,
    carrierFreqDL        INTEGER (0.. 16383),
    carrierBandwidthDL       ENUMERATED {n6, n15, n25, n50, n75, n100, spare2, spare1},
    mbsfn-SubframeConfigList    EUTRA-MBSFN-SubframeConfigList OPTIONAL,  --NeedM
    nrofCRS-Ports        ENUMERATED {n1, n2, n4},
    v-Shift              ENUMERATED {n0, n1, n2, n3, n4, n5}
}
```

Similar embodiments can be used for other rate matching parameters, including each rate matching pattern, ZP CSI-RS resource or resource set, periodic or semi-persistent NZP CSI-RS resource or resource set or resource setting. In order to avoid modifying the structure of IE RateMatchPatternLTE-CRS, in one embodiment, new RRC signaling may be introduced outside of IE RateMatchPatternLTE-CRS to inform UE about the following: a LTE CRS pattern is not available for PDSCH scheduled by a DCI from CORESET group ID 0 only, a LTE CRS pattern is not available for PDSCH scheduled by a DCI from CORESET group ID 1 only, a LTE CRS pattern is not available for PDSCH scheduled by a DCI from any of CORESET group ID 0 and 1. In other words, the new RRC signaling is to provide a mapping to the UE whether each CRS pattern is available or not available for PDSCHs from one CORESET group or multiple CORESET groups. The new RRC signaling is UE specific, and can be configured under PDSCH-ServingCell-Config or PDSCH-Config. In this case, multiple LTE CRS configurations are cell specific. After receiving multiple LTE CRS configurations, but before receiving the new RRC signaling, all CRS configurations are not available for PDSCHs from all CORESET groups. For instance, multiple CRS configurations, e.g. 4 are configured under ServingCellConfigCommon, and the new RRC signaling is configured under PDSCH-ServingCellConfig as follows:

CRS_configuration0 ENUMERATED {0,1, 2}
CRS_configuration1 ENUMERATED {0,1, 2}
CRS_configuration2 ENUMERATED {0,1, 2}
CRS_configuration3 ENUMERATED {0,1, 2}

For each CRS configuration 0, value 0 means the CRS configuration 0 is not available for PDSCH from CORESET group 0, value 1 means the CRS configuration 0 is not available for PDSCH from CORESET group 1, value 2 means the CRS configuration 0 is not available for PDSCH from either CORESET group 0 or 1.

Embodiment #3

As alluded to before, even when a non-ideal backhaul is deployed, that it is possible to support independent physical layer scheduling among coordinated TRPs. For multi-TRP transmission based on non-ideal backhaul, it is possible to support separate indications of dynamic information for two coordinated TRPs, especially separate QCL information indication.

Usually, TCI (Transmission configuration indication) in DCI is used to select one TCI state from N MAC CE activated TCI states, wherein N<=8. And the MAC CE is used to activated N TCI sates from M RRC configured TCI states wherein M<=128 or M depends on UE capability. Because of different directions from two TRPs to the UE, both the candidates of RRC configured TCI states and the MAC CE activated TCI states for two coordinated TRPs may be separate. For instance, there may be support two MAC CE, and two RRC configured TCI lists for the two TRPs. However, support for two MAC CEs increases the MAC CE overhead. Especially, the NR MACCE overhead has already been a big issue.

In order to support multiple TCI mapping between the codepoints of the DCI Transmission Configuration Indication field and MAC CE activated TCI states, in one embodiment, the MAC CE TCI activation/deactivation fields is divided into X field sets, and set x is associated with CORESET group ID x, x is 0 . . . X-1.

Embodiment #3-1

In one embodiment, as described in Table 1 below, one MAC CE TCI activation/deactivation field refers to one Ti field. Furthermore, it can be predefined that all MAC CE TCI activation/deactivation fields with value 1 are divided into X field sets. Assuming the number of MAC CE TCI activation/deactivation fields with value 1 in the MAC CE entity is Y, one option is that each set can have floor(Y/X) or ceil(Y/X) TCI activation/deactivation fields. Y should be equal or smaller than 16. The number of MAC CE TCI activation/deactivation fields per each set should not be larger than 8 because of only 3 bits TCI field in DCI.

For example, for the case that X=2, the total number of MAC CE TCI activation/deactivation fields is 128, Y=11, and Ti=1, i={2,3,8,18,23,24,50,62,70,88,93}. Tj=0, j is not equal to i. Then the TCI states corresponding to {T2, T3, T8, T18, T23} are associated with CORESET group 0, and the TCI states corresponding to {T24, T50, T62, T70, T88, T93} are associated with CORESET group 1. So the first set include floor(11/2)=5 TCI states, and the second set include 6 TCI states. Since the number of activated TCI states for multiple TRPs usually depends on the frequency bands, so the number of activated TCI states is the same or similar for different sets. If Y (total number of Ti with value 1) is even number, so two TRPs correspond to two CORESET group ID have the same number of activated TCI states. In the example, the TCI codepoint in a DCI from a CORESET with CORESET group ID 0 is to select one from TCI states corresponding to {T2, T3, T8, T18, T23}. And the TCI codepoint in a DCI from a CORESET with CORESET group ID 1 is to select one from TCI states corresponding to {T24, T50, T62, T70, T88, T93}.

TABLE 1

| | | | | | | | | |
|---|---|---|---|---|---|---|---|---|
| R | | | Serving Cell ID | | | | BWP ID | |
| $T_7$ | $T_6$ | $T_5$ | $T_4$ | $T_3$ | $T_2$ | $T_1$ | $T_0$ | Oct 1 |
| $T_{15}$ | $T_{14}$ | $T_{13}$ | $T_{12}$ | $T_{11}$ | $T_{10}$ | $T_9$ | $T_8$ | Oct 2 |
| | | | . . . | | | | | Oct 3 |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

Therefore, the set x of MAC CE TCI activation/deactivation fields activates the TCI states mapped to the TCI codepoints in a DCI which maps on a CORESET with CORESET group ID x. In other words, The $T_i$ field (in the set x of MAC CE TCI activation/deactivation fields) is set to 1 to indicate that the TCI state with TCI-StateId i shall be activated and mapped to the codepoint of the DCI Transmission Configuration Indication field, wherein the DCI is from a CORESET with CORESET group ID x. So the TCI codepoint in a DCI from a CORESET with CORESET group ID x is to select one TCI state from activated TCI states of set x.

It should be noted that in Rel-15 for $T_i$: If there is a TCI state with TCI-StateId i as specified in 5G specification TS 38.331, this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in 5G specification TS 38.214. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8.

Embodiment #3-2

A different embodiment from embodiment 3-1 is to predefine that all MAC CE TCI activation/deactivation fields are divided into X field sets. Assuming the number of MAC CE TCI activation/deactivation fields in the MAC CE entity is Y, one option is that each set can have floor(Y/X) or ceil(Y/X) TCI activation/deactivation fields. In each set, the number of TCI activation/deactivation field with value 1 should not be larger than 8.

For instance, for the case that X=2, the total number of MAC CE TCI activation/deactivation fields is 128, i.e. Y=128 MAC CE TCI activation/deactivation fields are divided into X=2 field sets, {T0, . . . T63} is the first set, {T64, . . . , T127} is the second set. The $T_i$ field (in the first set, i.e. i=0, . . . , 63) is set to 1 to indicate that the TCI state with TCI-StateId i shall be activated and mapped to the codepoint of the DCI Transmission Configuration Indication field, where the DCI from a CORESET with CORESET group ID 0. The $T_i$ field (in the first set, i.e. i=64, . . . , 127) is set to 1 to indicate that the TCI state with TCI-StateId i shall be activated and mapped to the codepoint of the DCI Transmission Configuration Indication field, where the DCI from a CORESET with CORESET group ID 1. If Ti=1, i={2,3,8,18,23,24,50,62,70,88,93}. Tj=0, j is not equal to i. Then the TCI states corresponding to {T2, T3, T8, T18, T23,T24,T50,T62} are associated with CORESET group 0, and the TCI states corresponding to {T70, T88, T93} are associated with CORESET group 1. So the first or second set include 64 MAC CE TCI activation/deactivation fields, but maximum 8 TCI states, i.e. maximum 8 MAC CE TCI field with value 1. In the example, the TCI codepoint in a DCI from a CORESET with CORESET group ID 0 is to select one from TCI states corresponding to {T2, T3, T8, T18, T23,T24,T50,T62}. And the TCI codepoint in a DCI from a CORESET with CORESET group ID 1 is to select one from TCI states corresponding to {T70, T88, T93}.

Embodiment #3-3

Yet another embodiment is to divide the MAC CE TCI activation/deactivation fields into X field sets based on higher layer signaling. One option is to configure X RRC configured TCI state lists, one RRC configured TCI state list corresponds to one set of the MAC CE TCI activation/deactivation fields. As shown in following RRC configuration, TCI states configured by tci-StatesToAddModList and tci-StatesToReleaseList correspond to the first set of the MAC CE TCI activation/deactivation fields. TCI states configured by tci-StatesToAddModList2 and tci-StatesToReleaseList2 correspond to the second set of the MAC CE TCI activation/deactivation fields.

```
PDSCH-Config ::=        SEQUENCE {
    tci-StatesToAddModList      SEQUENCE (SIZE(1..maxNrofTCI-States)) OF
TCI-State
    tci-StatesToReleaseList     SEQUENCE (SIZE(1 ..maxNrofTCI-States)) OF TCI-
StateId
    tci-StatesToAddModList2     SEQUENCE (SIZE(1..maxNrofTCI-States)) OF TCI-
State
    tci-StatesToReleaseList2    SEQUENCE (SIZE(1..maxNrofTCI-States)) OF TCI-
StateId
}
```

So in the MAC CE entity as shown in Table 1 above, the first M1 MAC CE TCI activation/deactivation fields correspond to the RRC configured TCI states of the first RRC configured TCI state list. M1 is the number of TCI states configured by tci-StatesToAddModList and tci-StatesToReleaseList. The remaining MAC CE TCI activation/deactivation fields correspond to the RRC configured TCI states of the second RRC configured TCI state list.

For instance, M1=30 TCI states are in the first RRC configured TCI state lists, and M2=98 TCI states are in the second RRC configured TCI state lists. Then the first 30 MAC CE TCI activation/deactivation fields are belong to the first set of MAC CE TCI activation/deactivation fields. And the remaining 98 MAC CE TCI activation/deactivation fields are belong to the second set of MAC CE TCI activation/deactivation fields. Therefore, the $T_i$ field (in the set x of MAC CE TCI activation/deactivation fields) is set to 1 to indicate that the TCI state with TCI-StateId i shall be activated and mapped to the codepoint of the DCI Transmission Configuration Indication field, wherein the DCI is from a CORESET with CORESET group ID x. So the TCI codepoint in a DCI from a CORESET with CORESET group ID x is to select one TCI state from activated TCI states of set x.

Yet another embodiment is to explicitly configure the number of TCI fields M1 in the first set of MAC CE TCI activation/deactivation fields by RRC signaling. The remaining ones are belong to the second set. Alternatively, gNB can explicitly configure the proportion between M1 and M2. Another embodiment may configure a group ID for each RRC configured TCI states. Then RRC configured TCI states with group ID x correspond to set x of MAC CE TCI activation/deactivation fields. Then, the Ti field is set to 1 to indicate that the TCI state with TCI-StateId i and with group ID x shall be activated and mapped to the codepoint of the DCI Transmission Configuration Indication field, wherein the DCI is from a CORESET with CORESET group ID x. So the TCI codepoint in a DCI from a CORESET with CORESET group ID x is to select one TCI state from set x of MAC CE TCI activation/deactivation fields with value 1, where those TCI states are configured with group ID x.

Embodiment #3-4

In an embodiment, one MAC CE may still be used but separate mapping of TCI codepoints may be supported for the multiple coordinated TRPs. And Rel-15 MAC CE can be completely reused. This embodiment may save MAC CE overhead significantly.

However, Rel-15 MAC CE can only support P MAC CE TCI activation/deactivation fields. In other words, i should be less than P for Ti. For multi-TRP transmission, if each TRP supports more than 64 RRC configured TCI states, the total number of RRC configured TCI states (same as P) will be more than P, then Rel-15 MAC CE will not work. In this case, two separate MAC CE entity can be supported. But if the total number of RRC configured TCI sates<=P, one MAC CE entity can still be used. Usually, P depends on UE capability or RRC configuration. The maximum number of P is 128.

Embodiment #3-5

In one embodiment, similar to the case with TCI, separate CSI trigger state mapping between the codepoints of the DCI CSI request field and MAC CE activated CSI trigger states may be supported. As shown in Table 2 below, one MAC CE activated CSI trigger state field refers to one Ti. So, in one embodiment, the solution is to divide the MAC CE CSI trigger state fields into X field sets, and set x is associated with CORESET group ID x, x is 0 . . . X-1.

TABLE 2

| Aperiodic CSI Trigger State Subselection MAC CE entity | | | | | | | | |
|---|---|---|---|---|---|---|---|---|
| R | | | Serving Cell ID | | | | BWP ID | |
| $T_7$ | $T_6$ | $T_5$ | $T_4$ | $T_3$ | $T_2$ | $T_1$ | $T_0$ | Oct 1 |
| $T_{15}$ | $T_{14}$ | $T_{13}$ | $T_{12}$ | $T_{11}$ | $T_{10}$ | $T_9$ | $T_8$ | Oct 2 |
| | | | . . . | | | | | Oct 3 |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

In an embodiment, the division of all MAC CE CSI trigger state fields with value 1 into X field sets may be predefined. Assuming that the number of MAC CE CSI trigger state fields with value 1 in the MAC CE entity is Y, one option is that each set can have floor(Y/X) or ceil(Y/X) CSI trigger state fields. An alternative is to predefine that all MAC CE CSI trigger state fields are divided into X field sets. Assuming the number of MAC CE CSI trigger state fields in the MAC CE entity is Y, one option is that each set can have floor(Y/X) or ceil(Y/X) TCI activation/deactivation fields.

In some embodiments, the MAC CE CSI trigger state fields may be divided into X field sets based on higher layer signaling. In yet another embodiment, X RRC configured CSI trigger state lists may be configured, one RRC configured CSI trigger state list corresponds to one set of the MAC CE CSI trigger state fields. One RRC configured CSI trigger state list is one higher parameter 'aperiodicTriggerStateList' in current the 5G 38.331 standard. Thus, similar embodiments which support separate TCI mapping may also be used for separate CSI trigger state mapping.

Embodiment #3-6

As described in embodiment 3-4, two separate MAC CE entities may be supported for two coordinated TRP transmission. However, when one MAC CE entity is received at UE, the UE may not be able to identify whether the MAC CE entity corresponds to CORESET group ID 0 or 1, which may cause ambiguity.

In one embodiment, the ambiguity may be resolved by predefining some rules, as follows. For instance, if the MAC CE entity for PDSCH TCI States Activation/Deactivation is carried by a PDSCH which is scheduled by a DCI associated with CORESET group ID 0, the MAC CE entity will correspond to CORESET group ID 0. Then the MAC CE entity activating N TCI states are used for any PDSCH scheduled by DCI associated with CORESEG group ID 0. If the MAC CE entity for PDSCH TCI States Activation/Deactivation is carried by a PDSCH which is scheduled by a DCI associated with CORESET group ID 1, the MAC CE entity will correspond to CORESET group ID 1. Then the MAC CE entity activating N TCI states are used for any PDSCH scheduled by DCI associated with CORESEG group ID 1.

For CSI trigger, a similar approach may be used. If the MAC CE entity for Aperiodic CSI Trigger State Subselection is carried by a PDSCH which is scheduled by a DCI associated with CORESET group ID 0, the MAC CE entity will correspond to CORESET group ID 0. Then the MAC CE entity activating Q CSI trigger states are used for any DCI associated with CORESEG group ID 0. If the MAC CE entity for Aperiodic CSI Trigger State Subselection is carried by a PDSCH which is scheduled by a DCI associated with CORESET group ID 1, the MAC CE entity will correspond to CORESET group ID 1. Then the MACCE entity activating Q CSI trigger states are used for any DCI associated with CORESEG group ID 1.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
   configuring, by a wireless communication node, a plurality of state fields indicative of a plurality of configured states into two medium access control (MAC) control elements (CEs), each of the two MAC CEs including a respective set of state fields of the plurality of state fields;
   associating, by the wireless communication node, the two MAC CEs with respective control resource set (CORESET) group identifiers and with respective cell identifiers of a plurality of configured states corresponding to the set of state fields of a respective MAC CE of the two MAC CEs, wherein each cell identifier of the respective cell identifiers is configured for a corresponding configured state of the plurality of configured states; and
   transmitting, by the wireless communication node to a wireless communication device, a MAC CE of the two MAC CEs and a respective CORESET group identifier associated with the MAC CE.

2. The wireless communication method of claim 1, wherein the plurality of state fields includes at least one of a transmission configuration indication (TCI) state field or a channel state information (CSI) trigger state field.

3. The wireless communication method of claim 1, wherein associating each MAC CE with a respective CORESET group identifier includes associating the MAC CE with a CORESET group identifier associated with a downlink control information (DCI) that schedules a communication channel configured to carry the MAC CE.

4. A wireless communication method, comprising:
   receiving, by a wireless communication device from a wireless communication node, a medium access control (MAC) control element (CE) from two configured MAC CEs, the MAC CE including a set of state fields of a plurality of state fields,
   wherein the MAC CE is associated with a respective control resource set (CORESET) group identifier and with a respective cell identifier of a plurality of configured states corresponding to the set of state fields of the MAC CE, wherein the respective cell identifier is configured for a corresponding configured state of the plurality of configured states.

5. The wireless communication method of claim 4, wherein the plurality of state fields includes at least one of a transmission configuration indication (TCI) state field or a channel state information (CSI) trigger state field.

6. The wireless communication method of claim 4, wherein for each MAC CEs of the two MAC CEs, the respective CORESET group identifier is a CORESET group identifier associated with a downlink control information (DCI) that schedules a communication channel configured to carry the MAC CEs.

7. A wireless communication apparatus comprising:
   at least one processor; and
   a memory storing executable instructions, which when executed by the at least one processor, cause the at least one processor to:
   configure a plurality of state fields indicative of a plurality of configured states into two medium access control (MAC) control elements (CEs), each of the two MAC CEs including a respective set of state fields of the plurality of state fields;
   associate the two MAC CEs with respective control resource set (CORESET) group identifiers and with respective cell identifiers of a plurality of configured states corresponding to the set of state fields of a respective MAC CE of the two MAC CEs, wherein each cell identifier of the respective cell identifiers is configured for a corresponding configured state of the plurality of configured states; and
   transmit, via a transmitter, to a wireless communication device, a MAC CE of the two MAC CEs and a respective CORESET group identifier associated with the MAC CE.

8. The wireless communication apparatus of claim 7, wherein the plurality of state fields includes at least one of a transmission configuration indication (TCI) state field or a channel state information (CSI) trigger state field.

9. The wireless communication apparatus of claim 8, wherein in associating each MAC CE with a respective CORESET group identifier, the processor is configured to associate the MAC CE with a CORESET group identifier associated with a downlink control information (DCI) that schedules a communication channel configured to carry the MAC CE.

10. A wireless communication apparatus comprising:
at least one processor; and
a memory storing executable instructions, which when executed by the at least one processor, cause the at least one processor to:
receive, via a receiver, from a wireless communication node, a medium access control (MAC) control element (CE) from two configured MAC CEs entities, the MAC CE including a set of state fields of a plurality of state fields,
wherein the MAC CE is associated with a respective control resource set (CORESET) group identifier and with respective cell identifier of a plurality of configured states corresponding to the set of state fields of the MAC CE, wherein the respective a cell identifier is configured for a corresponding configured state of the plurality of configured states.

11. The wireless communication apparatus of claim 10, wherein the plurality of state fields includes at least one of a transmission configuration indication (TCI) state field or a channel state information (CSI) trigger state field.

12. The wireless communication apparatus of claim 10, wherein for each MAC CE of the two MAC CEs, the respective CORESET group identifier is a CORESET group identifier associated with a downlink control information (DCI) that schedules a communication channel configured to carry the MAC CE.

* * * * *